United States Patent [19]

Adachi et al.

[11] Patent Number: 5,760,182

[45] Date of Patent: Jun. 2, 1998

[54] SOYBEAN PROTEIN AND ITS PRODUCTION

[75] Inventors: Tomohiko Adachi; Yasuo Otani, both of Izumisano; Mayumi Inoshita, Hannan; Motohiko Hirotsuka, Kaizuka, all of Japan

[73] Assignee: Fuji Oil Company, Limited, Japan

[21] Appl. No.: 528,816

[22] Filed: Sep. 15, 1995

[30] Foreign Application Priority Data

Sep. 30, 1994 [JP] Japan .................. 6-236623

[51] Int. Cl.$^6$ .................. A23J 1/14; A23L 1/28
[52] U.S. Cl. .................. 530/378; 530/422; 530/427; 426/430; 426/431; 426/598; 426/655; 426/656
[58] Field of Search .................. 530/378, 422, 530/427; 426/430, 431, 598, 655, 656

[56] References Cited

U.S. PATENT DOCUMENTS

| | | | |
|---|---|---|---|
| 3,944,676 | 3/1976 | Fridman et al. | 426/7 |
| 4,113,716 | 9/1978 | Coni et al. | 426/634 |
| 4,172,828 | 10/1979 | Davidson et al. | 426/656 |
| 4,346,122 | 8/1982 | Orthoefer et al. | 426/656 |
| 4,410,554 | 10/1983 | Sailer | 426/302 |
| 4,608,203 | 8/1986 | Ahosaka et al. | 530/378 |
| 5,086,166 | 2/1992 | Lawhon et al. | 530/378 |

FOREIGN PATENT DOCUMENTS

| | | |
|---|---|---|
| 58-076064 | 9/1983 | Japan . |
| 61-012262 | 1/1986 | Japan . |
| 61-031058 | 2/1986 | Japan . |
| 62-006656 | 1/1987 | Japan . |
| 63-173552 | 7/1988 | Japan . |

*Primary Examiner*—Cecilia J. Tsang
*Assistant Examiner*—Abdec A. Mohamed
*Attorney, Agent, or Firm*—Wenderoth, Lind & Ponack

[57] ABSTRACT

A soybean protein having both excellent color tone and heat gelling properties is disclosed. The soybean protein has a color tone of 25 or more as a z value of its 5% aqueous solution measured by a color difference meter and a heat-gelling value of 250 g·cm or more as a gel strength of its 18% aqueous solution heated at 80° C. for 30 minutes measured by a rheometer with a plunger ball of 4 mm diameter. A process for producing a soybean protein comprising adding 2 to 5 parts by weight of water to one part by weight of defatted soybeans and holding the mixture at 55° to 80° C. for 10 minutes or more before extraction of the soybean protein from the defatted soybeans with water is also disclosed.

5 Claims, No Drawings 5,760,182

SOYBEAN PROTEIN AND ITS PRODUCTION

FIELD OF THE INVENTION

The present invention relates to a soybean protein which has a white color tone and excellent heat-gelling properties.

BACKGROUND OF THE INVENTION

Recently, soybean proteins, especially isolated soybean proteins are utilized in various foods from the view point of their heat-gelling properties. When they are used, there is a problem that their yellowish color gives a strange appearance of color tone to various foods.

For solving this problem, many processes for producing isolated soybean proteins have been proposed.

JP-A 4-207159 discloses a process for producing a soybean protein material having a good color tone comprising neutralizing an aqueous dispersion of an acid-precipitated soybean protein with an alkaline metal hydroxide to adjust its to pH 6.2 to 8.0. In this process, the protein becomes insoluble because an alkaline earth metal hydroxide is used together, which results in decrease in heat-gelling properties.

In JP-A 55-156554 and the like, there are disclosed attempts to improve a taste and a color tone of soybean food products by washing defatted soybeans with hydrated ethanol to denature proteins. However, likewise, heat-gelling properties decrease.

Thus, any method for improving both color tone and physical properties such as heat-gelling properties has not been found heretofore in the prior art.

On the other hand, if a method for improving both color tone and physical properties of soybean proteins can be available, it will provide a broader application of soybean proteins.

OBJECTS OF THE INVENTION

The main object of the present invention is to provide a soybean protein, especially an isolated soybean protein, which has excellent heat-gelling properties together with excellent taste and white color tone.

This object as well as other objects and advantages of the present invention will become apparent to those skilled in the art from the following description.

SUMMARY OF THE INVENTION

The present invention provides a soybean protein which has a color tone of 25 or more as a z value of its 5% aqueous solution measured by a color difference meter and a heat-gelling value of 250 g·cm or more as a gel strength of its 18% aqueous solution heated at 80° C. for 30 minutes measured by a rheometer with a plunger ball of 4 mm diameter.

The present invention also provides a process for producing a soybean protein comprising adding 2 to 5 parts by weight of water to one part by weight of defatted soybeans and holding the mixture at 55° to 80° C. for 10 minutes or more before extraction of the soybean protein from the defatted soybeans with water.

DETAILED DESCRIPTION OF THE INVENTION

The present inventors have studied intensively so as to obtain a soybean protein having both excellent color tone and heat-gelling properties. As a result, it has been found that, even if almost native soybeans (normally, the NSI thereof is 80 or more) are used as a starting material, a satisfactory soybean protein can be obtained by adding a specific amount of water (normally, in an amount of 2 to 5 times the weight of the defatted soybeans) and holding the mixture at 55° to 80° C. for 10 minutes or more before extraction of a soybean protein according to a conventional method. More particularly, it has been found that the desired soybean protein can be obtained by holding defatted soybeans with a specific amount of water at a specific temperature, extracting a protein at a temperature lower than the above holding temperature (normally, 60° C. or lower) with a large amount of water (normally, in an amount excess of 5 times the weight of the defatted soybeans to be extracted) to separate into a water soluble fraction (soybean milk) from a water insoluble fraction ("okara": debris or residue of defatted soybeans) and subjecting the water soluble fraction to isoelectric precipitation to obtain a curd, from which an isolated soybean protein is produced. Thus, the present invention has been completed.

The term "heat-gelling properties" used herein means coagulation of a powdered protein when water is added to the protein in an amount of 3 to 5 times the weight of the protein and the mixture is heated at 70° to 100° C. after dispersing the protein uniformly with a food cutter or the like. The term "color tone" used herein is a "z" value of a 5% aqueous solution of a protein measured by a color difference meter. The term "heat-gelling value" is a gel strength of a 18% aqueous solution or slurry of a protein heated at 80° C. for 30 minutes measured by a rheometer. NSI means "nitrogen solubility index".

One aspect of the present invention is to provide a soybean protein.

The soybean protein of the present invention has a color tone of 25 or more, preferably 25 to 35 as a z value of its 5% aqueous solution measured by a color difference meter. A smaller z value represents that a color tone is not white and therefore the desired soybean protein cannot be obtained. At the same time, the soybean protein of the present invention has a heat-gelling value of 250 g·cm or more, preferably 250 to 400 g·cm as a gel strength of its 18% aqueous solution or slurry heated at 80° C. for 30 minutes, which is measured by a rheometer with a plunger ball having 4 mm diameter. When this value is smaller than 250 g·cm, the desired soybean protein cannot be obtained. No soybean protein which satisfies both criteria is not known.

Another aspect the present invention is to provide a process for preparing the soybean protein according to the present invention.

The process of the present invention is characterized by addition of a specific amount of water to defatted soybeans (2 to 5 times the weight of defatted soybeans) and holding the mixture at a specific temperature (55° to 80° C.) for 10 minutes or more, preferably 30 to 180 minutes before extraction of a soybean protein from the defatted soybeans with water.

The defatted soybeans to be used in the present invention may be, for example, whole soybeans from which soybean oil has been extracted by a conventional method.

According to the process of the present invention, the desired soybean protein can be obtained even when a defatted soybeans which have a low degree of denaturation such as those having about 80 or more of NSI are used. In general, when a soybean protein is produced by using defatted soybeans which have a high degree of denaturation due to heat treatment such as those having less than 80 of NSI, its taste can be improved, while a color tone of the resultant product tends to be yellowish.

Suitably, 2 to 5 parts, preferably 3 to 4 parts by weight of water is added to one part by weight of the defatted soybeans. When the amount of water is small, water added is absorbed only partially by the defatted soybeans. On the other hand, when too much water is added, a curd formed by isoelectric precipitation during extraction of a soybean protein is hardly dehydrated, which results in a low yield of the protein, a loose curd and/or poor heat-gelling properties. It is considered that whey components (albumin protein, saccharides and the like) remaining in the loose curd would lower heat-gelling properties. Although an amount of whey remaining in the loose curd can be decreased by washing it with water, a washing step is required, which results in increase in the production cost.

The preferred pH of the hydrated state after addition of water to the defatted soybeans is preferably neutral range (normally about 6.0 to 8.0). An extremely acidic pH or an extremely basic pH is not preferred.

The suitable holding time of the defatted soybeans at the above temperature is 10 minutes or more, preferably 30 minutes or more. The upper limit of the holding time is not defined, however the holding time is preferably shorter than 180 minutes because a longer holding time is not preferred from the viewpoint of productivity. A holding time shorter than 10 minutes is not preferred because heat-gelling properties of the resultant isolated soybean protein becomes low.

The holding temperature is 55° to 80° C., preferably 60° to 70° C. after addition of water to the defatted soybeans. When the temperature is low, the heat-gelling properties are low. On the other hand, a too high holding temperature makes the resultant curd loose, and the gel strength of a soybean protein obtained is low. As a means for stirring a mixture of the defatted soybeans and water, any known stirring and mixing apparatuses such as a paddle mixer, a rotor mixer or the like can be used.

The desired soybean protein can be extracted from the defatted soybeans hydrated by the above pre-treatment according to a conventional method for extracting a soybean protein.

The extraction temperature of the soybean protein can be that used in a conventional extraction process. For example, it is suitable that the extraction of the soybean protein can be carried out at a temperature lower than the above holding temperature of the pre-treatment (normally, 60° C. or lower, preferably 55° C. to 0° C.) in the presence of water in an amount more than the above (normally, excess of 5 times, preferably excess of 7 times, more preferably excess of 9 times the weight of the defatted soybeans).

When the amount of water added to the defatted soybeans for extraction is small, the viscosity of the resultant slurry is high, which makes stirring for extraction difficult. On the other hand, when the amount of water is too much (for example, excess of 30 times the defatted soybeans), the production cost becomes unpractically expensive.

Adjustment of the extraction temperature is scarcely required because the temperature is lowered by the addition of a large amount of water to the above pre-treated defatted soybeans. When an extraction temperature is too high, the amount of a solid matter of an-acid precipitated curd is small. That is, so-called "firmness" of the curd is lost and heat-gelling properties decreases.

In addition, the extraction pH is preferably about neutral range (6.0 to 8.0), more preferably 6.2 to 6.8. When the pH is too low, the yield of a protein extracted is small. On the other hand, when the pH is too high, the color tone of an isolated soybean protein obtained tends to be red-brownish.

As described hereinabove, the isolated soybean protein can be produced by extracting the soybean protein from the defatted soybeans and removing "okara" component and whey component.

For example, a water insoluble fraction ("okara") is separated and removed by centrifugation and the like. An acid (e.g. hydrochloric acid, sulfuric acid, etc.) is added to the resultant water soluble fraction (soybean milk) to conduct isoelectric precipitation and the whey component in the supernatant is separated and removed by centrifugation. The resultant protein precipitate can be neutralized and dried after heat sterilization to obtain a powder of the isolated soybean protein. The isolated soybean protein in the form of a solution or dispersion before drying also can be used.

As the soybean protein of the present invention, a concentrated soybean protein produced by removing whey from the defatted soybeans as well as an isolated soybean protein produced by removing the okara component therefrom and then neutralization can be used. From the viewpoint of a color tone and gel forming ability, the isolated soybean protein is preferred.

The soybean protein of the present invention can be suitably used for the production of food products requiring heating such as ham, sausage and daily dishes.

The following examples further illustrate the present invention in detail but are not to be construed to limit the scope thereof. In the following examples, all the parts and percent are by weight unless otherwise stated.

EXAMPLE 1

To substantially native defatted soybeans (3 parts, NSI: 86) was added warm water at 65° C. (12 parts) and they were stirred to form a uniform mixture.

The mixture was held at 60° C. for 60 minutes and additional warm water (12 parts) was added, followed by adjusting the pH to 7.2 and the temperature to 50° C. The mixture was stirred and extracted with a homo-mixer (manufactured by Tokushu Kika Kogyo KK.) for 30 minutes and then centrifuged at 1.300×G for 10 minutes with a centrifuge (manufactured by Kokusan KK.) to separate soybean milk from "okara".

Hydrochloric acid was added to the soybean milk to conduct acid precipitation at pH 4.5, followed by centrifugation at 1.300×G for 10 minutes with a centrifuge (manufactured by Kokusan KK.) to separate a curd from whey. The curd was neutralized with sodium hydroxide to pH 7.0. It was sterilized at 140° C. for 5 seconds and spray-dried to obtain a powder of the isolated soybean protein containing 4.5% water (T-1).

The color tone and the gel strength of the isolated soybean protein were evaluated.

The color tone of 5% aqueous solution of the isolated soybean protein obtained was measured by using a color difference meter (manufactured by Nippon Denshoku Kogyo KK.).

The gel strength of the isolated soybean protein was measured by filling a 18% paste of the isolated soybean protein (4.5 parts of water was added to one part of the powdered protein) into a casing of 35 mm lay-flat width and heating at 80° C. for 30 minutes to obtain a sample. The gel strength of the sample was measured by a rheometer (manufactured by Sanden KK.) using a plunger ball of 4 mm diameter.

The firmness of the curd was estimated by measuring the amount of the solid matter of the curd obtained by centrifugation after acid precipitation. The solid matter was measured by weighing the residual weight after standing the curd obtained by acid precipitation at 105° C. for 24 hours.

EXAMPLE 2

According to the same manner as described in Example 1, a powder of an isolated soybean protein (T-2) was obtained except that the holding was carried out at 55° C. for 60 minutes.

EXAMPLE 3

According to the same manner as described in Example 1, a powder of an isolated soybean protein (T-3) was obtained except that the holding was carried out at 80° C. for 60 minutes.

EXAMPLE 4

According to the same manner as described in Example 1, a powder of an isolated soybean protein (T-4) was obtained except that 6 parts of warm water at 65° C. was added to 3 parts of substantially native defatted soybeans (NSI 88).

EXAMPLE 5

According to the same manner as described in Example 1, a powder of an isolated soybean protein (T-5) was obtained except that 15 parts of warm water at 65° C. was added to 3 parts of substantially native defatted soybeans (NSI 88).

EXAMPLE 6

According to the same manner as described in Example 1, a powder of an isolated soybean protein (T-6) was obtained except that the holding was carried out at 60° C. for 10 minutes.

EXAMPLE 7

Warm water at 65° C. (12 parts) was added to 3 parts of substantially native defatted soybeans (NSI 86) and the mixture was held at 60° C. for 60 minutes. Tap water at 25° C. (12 parts) was added to adjust the pH to 6.8 and the temperature to 50° C.

The mixture was stirred and extracted for 30 minutes with a homo-mixer (manufactured by Tokushu Kika Kogyo KK.) and and then centrifuged at 1,300×G for 10 minutes with a centrifuge (manufactured by Kokusan KK.) to separate soybean milk from "okara".

According to the same manner as described in Example 1, a powder of the isolated soybean protein (T-7) was obtained from the soybean milk.

Comparative Example 1

To substantially native defatted soybeans (3 parts, NSI: 86) was added warm water at 50° C. (24 parts) and the pH was adjusted to 7.2. The mixture was stirred and extracted for 30 minutes with a homo-mixer (manufactured by Tokushu Kika Kogyo KK.).

The mixture was centrifuged at 1,300×G for 10 minutes with a centrifuge (manufactured by Kokusan KK.) to separate soybean milk from "okara ". According to the same manner as described in Example 1, a powder of the isolated soybean protein (C-1) was obtained from the soybean milk.

Comparative Example 2

To substantially native defatted soybeans (3 parts, NSI: 86), warm water at 95C. (12 parts) was added and they were stirred to form a uniform mixture. The mixture was held at 90° C. for 60 minutes. Then, the temperature was adjusted to 50° C. with tap water and ice (12 parts), and the pH was adjusted to 7.2. The mixture was stirred and extracted for 30 minutes with a homo-mixer (manufactured by Tokushu Kika Kogyo KK.).

The mixture was centrifuged at 1,300×G for 10 minutes with a centrifuge (manufactured by Kokusan KK.) to separate soybean milk from "okara ". According to the same manner as described in Example 1, a powder of the isolated soybean protein (C-2) was obtained from the soybean milk.

Comparative Example 3

To substantially native defatted soybeans (3 parts, NSI: 86) was added warm water at 45° C. (12 parts) and they were stirred to form a uniform mixture. The mixture was held at 40° C. for 60 minutes. Then, the temperature was adjusted to 50° C. with 12 parts of warm water and the pH was adjusted to 7.2. The mixture was stirred and extracted for 30 minutes with a homo-mixer (manufactured by Tokushu Kika Kogyo KK.).

The mixture was centrifuged at 1,300×G for 10 minutes with a centrifuge (manufactured by Kokusan KK.) to separate soybean milk from "okara ". According to the same manner as described in Example 1, a powder of the isolated soybean protein (C-3) was obtained from the soybean milk.

Comparative Example 4

To substantially native defatted soybeans (3 parts, NSI: 86) was added warm water at 65° C. (21 parts) and they were stirred to form a uniform mixture. The mixture was held at 60° C. for 60 minutes. Ice (3 parts) was added to adjust the temperature to 50° C. and the pH was adjusted to 7.2. Then, the mixture was stirred and extracted for 30 minutes with a homomixer (manufactured by Tokushu Kika Kogyo KK.).

The mixture was centrifuged at 1,300×G for 10 minutes with a centrifuge (manufactured by Kokusan KK.) to separate soybean milk from "okara ". According to the same manner as described in Example 1, a powder of the isolated soybean protein (C-4) was obtained from the soybean milk.

Comparative Example 5

To substantially native defatted soybeans (3 parts, NSI: 86) was added warm water at 65° C. (3 parts) and they were stirred so as to obtain a uniform mixture. The mixture was held at 60° C. for 60 minutes. Warm water (21 parts) was added to adjust the temperature to 50° C. and the pH was adjusted to 7.2. The mixture was stirred and extracted for 30 minutes with a homo-mixer (manufactured by Tokushu Kika Kogyo KK.).

The mixture was centrifuged at 1,300×G for 10 minutes with a centrifuge (manufactured by Kokusan KK.) to separate soybean milk from "okara ". According to the same manner as described in Example 1, a powder of the isolated soybean protein (C-5) was obtained from the soybean milk.

Comparative Example 6

To substantially native defatted soybeans (3 parts, NSI: 86) was added warm water at 65° C. (12 parts) and they were stirred to form a uniform mixture. The mixture was held at 60° C. for 5 minutes. Tap water (12 parts) was added to adjust the temperature to 50° C. and the pH was adjusted to 7.2. Then, the mixture was stirred and extracted for 30 minutes with a homo-mixer (manufactured by Tokushu Kika Kogyo KK.).

The mixture was centrifuged at 1,300×G for 10 minutes using a centrifuge (manufactured by Kokusan KK.) to separate soybean milk from "okara". According to the same manner as described in Example 1, a powder of the isolated soybean protein (C-6) was obtained from the soybean milk.

Comparative Example 7

To substantially native defatted soybeans (3 parts, NSI: 86) was added warm water at 65° C. (12 parts) and they were was stirred to form a uniform mixture. The mixture was held at 60° C. for 60 minutes. Warm water at 75° C. (12 parts) was added to adjust the temperature to 70° C. and the pH was adjusted to 7.2. Then, the mixture was stirred and extracted for 30 minutes with a homo-mixer (manufactured by Tokushu Kika Kogyo KK.).

The mixture was centrifuged at 1,300×G for 10 minutes with a centrifuge (manufactured by Kokusan KK.) to separate soybean milk from "okara". According to the same manner as described in Example 1, a powder of the isolated soybean protein (C-7) was obtained from the soybean milk.

The color tone of the 5% solution, firmness of the gel prepared by heating the 18% paste of the isolated soybean protein and the solid matter in the acid-precipitated curd thus produced are shown in Tables 1 and 2.

TABLE 1

| Isolated soybean protein | T-1 | T-2 | T-3 | T-4 | T-5 | T-6 | T-7 |
|---|---|---|---|---|---|---|---|
| Curd solid matter (%) | 40 | 39 | 40 | 39 | 39 | 39 | 41 |
| Color tone | | | | | | | |
| a value | −4.0 | −4.1 | −3.9 | −4.0 | −3.8 | −3.8 | −4.1 |
| b value | 1.0 | 1.0 | 1.1 | 1.1 | 0.9 | 0.9 | 0.9 |
| z value | 28 | 27 | 26 | 26 | 26 | 25 | 31 |
| Gel strength (g · cm) | 280 | 260 | 265 | 258 | 260 | 252 | 300 |

TABLE 2

| Isolated soybean protein | C-1 | C-2 | C-3 | C-4 | C-5 | C-6 | C-7 |
|---|---|---|---|---|---|---|---|
| Curd solid matter (%) | 40 | 32 | 39 | 31 | 40 | 40 | 33 |
| Color tone | | | | | | | |
| a value | −4.2 | −1.5 | −4.0 | −4.1 | −4.2 | −4.1 | −4.0 |
| b value | 0.9 | 1.5 | 1.0 | 0.8 | 0.9 | 0.9 | 0.9 |
| z value | 25 | 28 | 26 | 26 | 26 | 26 | 25 |
| Gel strength (g · cm) | 100 | 120 | 95 | 130 | 120 | 120 | 115 |

By comparing T-1 with C-1, when warm water at 65° C. is added in the amount of 4 times the weight of the defatted soybeans (NSI 86) and holding is carried out at 60° C. for 60 minutes, increase in both gel strength and z value (whiteness), are observed in comparison with the product obtained without these treatment. Thus, it is shown that the heat treatment (holding) according to the present invention is effective.

By comparing T-1 with C-2, when warm water at 95° C. was added in the amount of 4 times the weight of the defatted soybeans (NSI 86) and holding is carried out at 90° C. for 60 minutes, decrease in firmness of the curd and increase in the a value (redness) are observed, while no increase in the gel strength is observed. Thus, it is shown that the desired soybean protein cannot be obtained by heating at a too high temperature.

By comparing T-1 with C-3, when warm water at 45° C. is added in the amount of 4 times the weight of the defatted soybeans (NSI 86) and holding is carried out at 40° C. for 60 minutes, no increase in the gel strength is observed. Thus, it is shown that the desired soybean protein cannot be obtained by heating at a too low temperature.

By comparing T-1 with C-4, when warm water at 65° C. is added in the amount of 7 times the weight of the defatted soybeans (NSI 86) and holding is carried out at 60° C. for 60 minutes, decrease in firmness of the curd is observed, while no increase in the gel strength is observed. This shows that to avoid the addition of too much water in the holding is of importance.

By comparing T-1 with C-5, when the equal amount of warm water at 65° C. was added to the defatted soybeans (NSI 86) and holding is carried out at 60° C. for 60 minutes, no increase in the gel strength is observed. This shows that to add a certain enough amount of water in the holding is of importance.

By comparing T-1 with C-6, when warm water at 65° C. is added in the amount of 4 times the weight of the native defatted soybeans and holding is carried out for 5 minutes, no increase in the gel strength is observed. This shows that the holding time is of importance.

By comparing T-1 with C-7, when the extraction is carried out at 70° C., decrease in firmness of the curd is observed, while no increase in the gel strength is observed. This shows that to avoid a too high extraction temperature is of importance.

Example 8 and Comparative Example 8

According to the formulations as shown in Table 3, sausages were produced by using the same amounts of the powdered soybean proteins T-1 and C-1, respectively.

TABLE 3

| Formulation of Sausage (Parts) | | |
|---|---|---|
| Ingredients | Example 8 | Comparative Example 8 |
| Pork (shoulder) | 43 | 43 |
| Lard | 18.5 | 18.5 |
| Isolated soybean protein T-1 | 5 | — |
| Isolated soybean protein C-1 | — | 5 |
| Water | 33.5 | 33.5 |
| Total | 100 | 100 |
| Salt | 1.7 | 1.7 |
| L-Ascorbic acid | 0.03 | 0.03 |
| Sodium pyrophosphate | 0.3 | 0.3 |
| Sodium nitrite | 0.01 | 0.01 |
| Monosodium glutamate | 0.3 | 0.3 |
| Sugar | 0.3 | 0.3 |
| Potassium sorbate | 0.1 | 0.1 |
| Fumarate CF | 0.2 | 0.2 |

The sausages were produced according to a conventional method using a silent cutter (manufactured by Higashimoto Kikai KK.).

Hardness of the sausage cut into 10 mm thickness was measured with a rheometer ("RHEONER" manufactured by Yamaden KK.). Then, using the same sample of the sausage, its color tone was measured with a color difference meter (manufactured by Nippon Denshoku KK.).

An organoleptic test was carried out by five panelists. The average of scores (point 5: excellent, point 4: good, point 3: average, point 2: rather bad, and point 1: bad) was employed.

The results are shown in Table 4.

TABLE 4

|  | Example 8 | Comparative Example 8 |
|---|---|---|
| Hardness ($\times 10^6$ dyne/cm$^2$) | 1.75 | 1.49 |
| Color tone |  |  |
| a value | 6.3 | 6.2 |
| b value | 9.7 | 9.6 |
| z value | 52 | 50 |
| Organoleptic test |  |  |
| taste | 5 | 3 |
| color tone | 5 | 4.5 |
| mouth feel | 5 | 2 |

As seen from Table 4, clear differences are observed. This shows that the treatment according to the present invention is also effective in practical.

As described hereinabove, according to the present invention, the isolated soybean protein having excellent heat gelling properties as well as excellent taste and white color tone can be produced.

What is claimed is:

1. A soybean protein which has a color tone of 25 to 35 as a z value of its 5% aqueous solution measured by a color difference meter and a heat-gelling value of 250 to 400 g·cm as a gel strength of its 18% aqueous solution heated at 80° C. for 30 minutes measured by a rheometer with a plunger ball of 4 mm diameter.

2. A soybean protein according to claim 1 which is an isolated soybean protein.

3. A process for producing a soybean protein comprising:

a) adding 3 to 4 parts by weight of water to one part by weight of defatted soybeans and then b) holding the mixture at a holding temperature of 55° to 80° C. for 10 to 180 minutes before extraction of the soybean protein from the defatted soybeans with water.

4. A process according to claim 3, wherein the extraction is carried out by addition of water in an amount excess of 5 times the weight of the defatted soybeans at a temperature of lower than the holding temperature.

5. A process according to claim 4, wherein the extraction is carried out at 60° C. to 0° C.

* * * * *